United States Patent Office 3,409,501
Patented Nov. 5, 1968

3,409,501
PYROGENIC TiO₂ PIGMENT AND METHOD FOR PRODUCING SAME
Walter T. Siuta, Metuchen, N.J., assignor to National Lead Company, New York, N.Y., a corporation of New Jersey
No Drawing. Continuation-in-part of application Ser. No. 369,291, May 21, 1964. This application Dec. 10, 1965, Ser. No. 513,115
7 Claims. (Cl. 162—166)

ABSTRACT OF THE DISCLOSURE

The present invention relates in general to pigmentary titanium dioxide produced by the vapor phase oxidation of $TiCl_4$ and more especially to untreated, uncoated $TiO_2$ burner discharge having one or more coatings thereon of partially dehydrated hydrous oxides of silicon and aluminum to render the pigment photochemically inert; and to coating compositions, plastics and resinous materials containing said hydrous oxide coated $TiO_2$ pigment.

---

The instant application is a continuation-in-part of my co-pending application Ser. No. 369,291, filed May 21, 1964, and now abandoned.

The so-called vapor phase process for producing pyrogenic $TiO_2$ pigment is carried out, in general, by a vapor phase reaction in which volatilized titanium tetrachloride is reacted with oxygen, or an oxygen containing gas, at an elevated temperature, i.e. above 800° C., with or without water vapor and, if desired, in the presence of an auxiliary flame, to produce a pyrogenic $TiO_2$ of uniformly fine particle size. For the purpose of this invention the pyrogenically produced $TiO_2$ may be the product of the vapor phase reaction of $TiCl_4$ and $O_2$ only; or a product produced by adding a volatile metal compound such as, for example, aluminum chloride to the reactants prior to the reaction such that an oxide of the volatile metal compound is formed in situ on the pyrogenic $TiO_2$ during production. These volatile metal compound additions are sometimes referred to as pre-burner additions and the instant invention contemplates the production of a pyrogenic $TiO_2$ having no pre-burner additions as well as pre-burner additions of from 1–3% alumina.

The pyrogenic $TiO_2$ produced as burner discharge in a vapor phase process is exceptionally pure and is of uniformly fine particle size. Moreover, the particles are only weakly agglomerated and hence require only relatively light milling, if at all, as a consequence of which the milled agglomerates are subject to minimum contamination.

It follows, therefore, that the $TiO_2$ burner discharge produced by a vapor phase process constitutes an unusually good pigmentary material for many uses.

However, the optimum pigmentary properties required for use in coating compositions such as paints, and enamels or in plastics, resinous materials and the like are not fully developed. Thus the chalk resistance of paints and enamels pigmented with burner discharge i.e. an untreated pyrogenic $TiO_2$, is considerably less than that desired for use in automotive finishes. Similarly sensitivity to light, sometimes referred to hereinafter as color degradation, is much too high for use in plastics and resinous materials, such as for example, melamine and urea formaldehyde resins, vinyl chlorides, and the like.

An object, therefore, of the present invention is to provide an improved photochemically inert pyrogenic $TiO_2$ pigment for use in coating compositions, plastics, resinous materials and the like.

Another object of the invention is to provide a photochemically inert pyrogenic $TiO_2$ pigment for use in producing paints and enamels having high chalk resistance; and in the production of pigmented plastic and resinous materials having low color degradation when exposed to ultra violet light.

Another object of the invention is to treat a $TiO_2$ burner discharge with certain hydrous oxides so as to enhance chalk resistance of paints and enamels and lower the color degradation of resinous materials, i.e. paper laminates in which the resulting pigment is used.

A still further object of the invention is to provide $TiO_2$ pigmented paper laminates having low color degradation when exposed to ultra violet light.

These and other objects, features and advantages of the invention will be set out in more detail in the description and examples which follow.

In its broadest aspects the instant invention relates to the production of photochemically inert pyrogenic $TiO_2$ pigment particularly adapted for use in high chalk resistant paints and enamels, and in light-stable plastic and resinous materials; and to a method for producing the same wherein an untreated pyrogenic $TiO_2$ pigmentary material is treated with alumina and silica in combination, and thereafter calcined at a temperature sufficiently high to at least partially dehydrate the hydrous oxide coating on the pigment.

The untreated or uncoated pyrogenic $TiO_2$ is preferably obtained as burner discharge from a conversion unit in which gaseous $TiCl_4$ is reacted with oxygen at a temperature in excess of 800° C. and in the presence of aluminum chloride.

A typical process for producing burner discharge suitable for effecting the objects of the instant invention is described in U.S. 2,559,638. According to the present invention at $TiO_2$ burner discharge is added to water to yield a slurry containing 20–35% $TiO_2$ and to this slurry is added a dispersant solution containing sodium hydroxide and sodium hexametaphosphate for the purpose of increasing the fluidity of the slurry so as to prevent blockage in the pulp tank lines and pumps; and also to neutralize the hydrochloric and hypochlorous acids present in the slurry—the dispersant being added at a rate to yield about 0.2% sodium hexametaphosphate on a pigment weight basis and a pH of about 8.0. In addition to the dispersant an antichlor solution, i.e. sodium sulfite may be added to destroy hypochlorites which are corrosive at concentration greater than about 35 p.p.m.—the reaction between the sodium sulfite and hypochlorite producing harmless reaction products i.e. sodium sulfate and sodium chloride.

Following the above described treatment the $TiO_2$ slurry is pumped to storage tanks and from thence to the treatment sections of the plant where the pyrogenic $TiO_2$ is diluted with water and is coated with a combination of the hydrous oxides of aluminum and silicon, for imparting the desired photochemical inertness thereto.

As explained hereinafter the hydrous oxides used to coat the pyrogenic $TiO_2$ are those of silicon and aluminum exclusively and these may be precipitated onto the $TiO_2$ burner discharge successively or simultaneously. In the latter instance the respective oxides may be used in stoichiometric proportions such as to form hydrous aluminum silicate, the term "alumina-silica coating" as used hereinafter being comprehensive of an admixture of silica and alumina or a coating of hydrous aluminum silicate. It is essential moreover, that after deposition of the hydrous oxides on the $TiO_2$ the coated $TiO_2$ be dried and subsequently calcined at a temperature sufficient to at least partially dehydrate the hydrous oxide coating, i.e. remove at least some of the chemically combined water. For the hydrous oxide coated pigment of this invention partial dehydration is effected by calcining the coated $TiO_2$ for from one to three hours at temperatures within the range of from 200–650° C.

In general the coated pyrogenic TiO₂ pigments of this invention are prepared by admixing an aqueous slurry of untreated, uncoated TiO₂ burner discharge with aqueous solutions of ionizable compounds of aluminum and silicon. These ionizable compounds may be added in a ratio such that the hydrous oxides of aluminum and silicon are in the mole ratio of 1:1 with the total oxide coating comprising about 6% by weight of the TiO₂. However, the 1:1 mole ratio of alumina and silica is not critical and mole ratios of alumina and silica from 1:2 to 2:1 may be used, while the total amount of oxides may vary from 2 to 15% by weight of the TiO₂.

It is preferable when making the silica-alumina coated pigments that the silicate solution be added before the aluminum compounds. This order of addition is preferred since the silicate solution serves to disperse the TiO₂ in the slurry so that when the aluminum compound is added the precipitated alumina and silica, or aluminum silicate, as the case may be, coats an optimum number of discrete TiO₂ particles. Moreover, by adding the aluminum compound last it serves to coagulate the TiO₂ slurry and hence facilitates filtering and washing the coated pigment. The amount of anhydrous alumina calculated as $Al_2O_3$ used to coat the TiO₂ burner discharge may vary from 3 to 7% but is preferably about 4% based on the weight of the TiO₂ while the amount of silica calculated as $SiO_2$ may vary from 1 to 4% but is preferably about 2% based on the weight of the TiO₂.

Aluminum compounds which have been found satisfactory for the purpose of this invention include aluminum sulfate, aluminum nitrate, aluminum chloride and similar ionizable aluminum salts as well as various aluminates including sodium aluminate, potassium aluminate and the like. Since the aluminates are highly alkaline, it will be necessary in such cases to acidify the slurry to a pH of about 7.0 after treatment.

The hydrous silica may be derived from any soluble silicate such as for example, sodium, potassium, and ammonium silicates. However, for reasons of economy and availability sodium silicate and preferably sodium meta silicate ($Na_2O \cdot SiO_2$) is used.

One particular way in which the coated pyrogenic TiO₂ pigment of this invention may be prepared is as follows: An aqueous slurry of pyrogenic titanium dioxide prepared as described above containing 1000 gm. of TiO₂ at 20 percent solids and having a pH of about 7.7 was treated with 200 ml. of sodium silicate solution containing 26.6 gm. of NaOH and 20 gm. SiO₂. The batch was heated to 60° C. Then 400 ml. of an aluminum sulfate solution (equivalent to 40 gm. of alumina and 116 gm. of sulfuric acid) was added to the slurry. The batch was neutralized to a pH of 7.0 with 292 ml. of sodium hydroxide solution containing 60.5 gm. of NaOH to precipitate a coating of the hydrous oxides of aluminum and silicon on the TiO₂. The quantity of coating, calculated to give a 1:1 $Al_2O_3$ to $SiO_2$ mole ratio product, i.e. 4% $Al_2O_3$ and 2% $SiO_2$ after calcination, was 6 percent of the weight of the titanium dioxide. The $H_2SO_4$/NaOH ratio was 1.21 compared to a theoretical of 1.23. The hydrous oxide coated TiO₂ was further heated for one hour at 60° C., filtered, washed relatively salt free with water, and dried at 120° C. It was then partially dehydrated by calcining at 500° C., dry milled and pulverized.

Other procedures for coating an untreated TiO₂ burner discharge may be used such as for example, one wherein the sodium silicate solution is alkalized prior to its addition to the TiO₂ slurry as a consequence of which an aluminum silicate gel is formed on the TiO₂ which is subsequently calcined; or by the simultaneous addition of aqueous solutions of alkalized sodium silicate and aluminum silicate in stoichiometric proportions so as to form an aluminum silicate coating on the TiO₂—both of the above described techniques being well within the knowledge of persons skilled in the art.

As pointed out above one of the important uses of the improved pyrogenic TiO₂ pigment of this invention is in the preparation of paints and enamels having maximum resistance to chalking such as is required in automotive finishes. The following examples will serve to illustrate the superior chalking properties of the pyrogenic TiO₂ pigments of this invention over TiO₂ pigments of the prior art when incorporated in a standard paint formulation.

EXAMPLE I

Untreated, uncoated TiO₂ burner discharge having a partially dehydrated alumina-silica coating prepared as hereinabove described was incorporated in a paint composition which was used to prepare test panels which, in turn, were tested for chalking using the method described below:

Preparation of test panels

A baking enamel was prepared by adding 32.5 g. of the treated pigment to 15.0 g. of Beckosol 1307–50EL in a mixing container in which the constituents were mixed thoroughly with a spatula and then passed twice through a three-roller mill. 35.0 g. of the paste was collected in a one quarter pint can and to this was added 91.5 ml. of a composite vehicle comprising:

| | G. |
|---|---|
| Black paste | 2.0 |
| Beckosol 1307–50EL | 64.3 |
| Butanol | 6.4 |
| Xylene | 5.6 |
| BU spray solvent | 8.9 | the composite vehicle being added to the paste in at least three increments. The can was capped and rolled overnight. The rolled paint was strained through a cloth filter and sprayed at 40 p.s.i. air pressure onto a test panel. After air drying for at least five minutes the enameled test panels were baked at 150° C. for 80 minutes. After cooling the panels were wet-sanded, washed and recoated with a second spray coating using the same baking schedule.

Chalking test

The initial 20° gloss value of the center portion of each test panel is determined using a Gardner portable 20° Glossmeter (Gardner Laboratory Inc., Bethesda, Md.). The test panel is then exposed on a 45° fence facing south at Miami, Fla., without interruption, taking periodic readings until the level of gloss reaches 5–10. Gloss readings versus weeks exposure are plotted on coordinate paper (gloss values as ordinate). The durability in weeks i.e. resistance to chalking of the paint composition is then determined using the formula:

$$D^{st} = I - \frac{0.75 \; Go}{S}$$

where Go is the average gloss level of all the readings, I is the time in weeks corresponding to Go, and S is the slope of a line having the best average fit of the gloss readings and corresponds to the rate of chalking of the paint film.

The glossmeter 20° data for a paint composition pigmented with the pyrogenic TiO₂ for Example I are given in Table I below. It will be seen that the average gloss (Go) of the panel of Example I was 54; that this average gloss was measured over a period of 19 weeks, that a 75% loss in gloss occurred after 13 weeks, that the durability i.e. resistance to chalking was 32 and the rate of chalking was —3.27.

EXAMPLE II

Additional paint compositions were tested for chalking using modification of the pyrogenic TiO₂ described in Example I. In Example II the pyrogenic TiO₂ was coated with the hydrous oxides of aluminum and silicon and partially dehydrated by heating to 650° C. The chalking data are shown in Table I. It will be noted that while the average gloss value is somewhat lower (52) durability was increased from 32 to 35 and the rate of chalking decreased from −3.27 to −2.99.

EXAMPLES III and IV

In order to show the marked improvement in pigmentary properties i.e. chalking of a pyrogenic $TiO_2$ coated with partially dehydrated hydrous oxides of aluminum and silicon as against an uncoated (burner discharge) pyrogenic $TiO_2$, or a pyrogenic $TiO_2$ pigment having a non-dehydrated coating of hydrous oxides, chalking tests were made of test panels incorporating these two types of pigments.

The data for Example III, which used a pyrogenic $TiO_2$ burner discharge having no coating, show that while the average gloss value of the paint was high (62) it only lasted for 12 weeks; the durability or resistance to chalking was very low (24 weeks) and the rate of chalking high −3.81.

Example IV illustrates the chalking resistance characteristics of a paint pigmented with a coated pigment prepared as in Example I except that the hydrous oxide coating was merely dried at 120°, i.e. not heated sufficiently to effect, at least, partial dehydration of the coating. The data show that this paint had about the same gloss value (54) as that of a paint pigmented with a calcined coated pigment, but with lower durability and chalking values.

TABLE I.—CHALK RESISTANCE OF HYDROUS OXIDE COATED PYROGENIC $TiO_2$ PIGMENT

| Exp. | Pig. treat. | Cal. temp., °C. | Avg. gloss (Go) | I | 75% loss in gloss (wks.) | D | S |
|---|---|---|---|---|---|---|---|
| I | $Al_2O_3+SiO_2$ | 500 | 54 | 19 | 13 | 32 | −3.27 |
| II | $Al_2O_3+SiO_2$ | 650 | 52 | 22 | 13 | 35 | −2.99 |
| III | burner discharge | | 62 | 12 | 12 | 24 | −3.81 |
| IV | $Al_2O_3+SiO_2$ (dried). | 120 | 54 | 19 | 12 | 31 | −3.22 |

From the foregoing examples it is clear that an untreated, uncoated $TiO_2$ burner discharge coated with the hydrous oxides of aluminum and silicon and calcined at a temperature sufficiently high to effect partial dehydration i.e. temperatures within the range of from 500–650° C. imparts good chalking characteristics to paint compositions in which the pigment is used; and that pyrogenic $TiO_2$ having no coating of the oxides of aluminum and silicon, i.e. burner discharge, or coatings of alumina and silica which have not been, at least, partially dehydrated produce paints having inferior chalking characteristics.

It has also been discovered that a pyrogenic $TiO_2$ pigment having a partially dehydrated coating of alumina and silica is an especially desirable filler or opacifier for use in resinous materials such as for example vinyl chlorides, and amine resins, i.e. melamine and urea formaldehyde resins, the terms resins or resinous materials as used herein being comprehensive of vinyl chloride, amine resins and the like.

It is significant that an uncoated pyrogenic $TiO_2$ i.e. burner discharge or a pyrogenic $TiO_2$ coated with titania, silica or alumina alone; or with the combination of titania and alumina; or titania, silica and alumina, and subsequently heated to partially dehydrate the hydrous oxides will have relatively high discoloration ratings when exposed to ultraviolet light as compared to the discoloration ratings of a pyrogenic $TiO_2$ coated with partially dehydrated oxides of aluminum and silicon exclusively.

A specific application is in the field of laminates by which is meant products in which a resin acts not only as an adhesive to hold together layers or masses of such materials as wood, glass-fiber and paper but also to impart strength and durability to the finished product. One of the most familiar applications is that of paper laminates used for counter tops, shelving and panelling, although formed products such as tubing, helmets and the like are currently produced by high-pressure laminating processes.

Just as it was found that $TiO_2$ burner discharge treated with a partially dehydrated coating of the hydrous oxides of aluminum and silicon exclusively has superior chalking characteristics, it has also been found that a similar treatment will insure the production of pigmented resinous materials, plastic and the like having low color degradation when exposed to ultraviolet light. As will be shown by the examples below not only is the combination of alumina and silica critical but that partial dehydration of the hydrous oxides is also essential.

Paper laminates

There are at least two ways in which the preparation of pigmented resinous materials and in particular opacified paper laminates may be carried out, the one method being that wherein paper laminates are prepared by impregnating a finished paper with a slurry comprising the aforesaid oxide coated pyrogenic $TiO_2$ pigment and a resin in a solution of water and alcohol. After the impregnated paper has dried a plurality of sheets of impregnated paper are superposed and formed into an opacified paper laminate by well-known hot pressing techniques.

As an alternative method of preparing an opacified paper laminate the aforesaid oxide coated pyrogenic $TiO_2$ pigment may be added to the paper stock used in the manufacture of the paper. The finished pigmented paper is then impregnated with an alcohol-water solution of the resin, after which a plurality of sheets of the pigmented, resin-impregnated paper are laminated by hot pressing techniques. It has been found that laminates prepared in this manner will have discoloration rates generally lower than laminates prepared by impregnating a finished paper.

Discoloration test

In order to determine the color stability of paper laminates opacified with an alumina-silica coated pyrogenic $TiO_2$ pigment prepared as hereinabove described a test was devised as a standard for measuring the discoloration of a pigmented paper laminate when exposed to ultra violet light. This test was carried out using a Standard Colormaster Differential Colorimeter and a battery of type RS reflector sunlamps. The latter were arranged circumferentially in groups of six approximately 5 inches above the top of a turntable which was rotated at a speed of 3 revolutions per minute. The specimen laminates to be evaluated were first tested for blue, green and red reflectance values using the Colormaster Differential Colorimeter. Thereafter the test laminates were placed in the turntable beneath the bank of sunlamps and rotated for a period of 4 hours. The temperature at the surface of the turntable was maintained between 65° C. and 80° C.

After exposure for the aforesaid length of time the blue, green and red reflectance values of the exposed laminates were determined. Using these two sets of readings the average total discoloration in percent is determined by the formula:

$$D = \frac{b+g+r}{3}$$

where D is the average percentage discoloration and $b$, $g$, and $r$ are the changes in blue, green and red readings in percentage after exposure.

It has been found by experiment that a 4.5 percent or lower discoloration rating is satisfactory since at this level it is virtually impossible to detect color differences by the naked eye. A percent discoloration rating of 5 is permissible as the upper limit which is still considerably below the percent discoloration ratings of oxide coated pigments known and used heretofore.

To further illustrate the invention as related to resinous materials and plastics the following examples are given, the data being tabulated below.

EXAMPLE V

Untreated, uncoated $TiO_2$ burner discharge was coated with the hydrous oxides of aluminum and silicon as follows: an aqueous slurry of pyrogenic $TiO_2$ containing 2% preburner alumina addition (600 g.) was slurried in water at 20% solids, heated at 60° C. and then treated with 2% silica from 239 ml. of a sodium silicate solution of 50.3 g.p.l. silica; and 4% alumina from 223 ml. of an aluminum sulfate solution of 107.8 g.p.l. alumina. The admixture was neutralized with 335 ml. of sodium hydroxide solution of 100 g.p.l. NaOH. The treated $TiO_2$ was filtered, washed with one and one half volumes of water, dried at 120° C. and then chaser milled and pulverized. 25 grams of the dried and milled pigment were then used to opacify a paper laminate as follows:

60 ml. of de-ionized water were mixed with 51 ml. of filtered denatured alcohol and 100 grams of a commercial grade melamine-formaldehyde resin for 30 seconds in a covered Waring Blendor. To this mixture was added 25 grams of the pigment made as described above and the mixture was stirred for an additional 10 minutes. The resulting slurry was then poured into a 250 ml. container. Four strips of filter paper (similar to Whatman No. 3) measuring 2.5 x 5.5 inches were dipped successively into the slurry. The excess slurry was removed from the slips of paper by drawing the slip of paper first one side and then the other over ½ inch glass rod. Thereafter the saturated strips of paper were hung from a wire rack and the rack was transferred to an oven preheated to 140° C. in which the saturated strips of paper were cured for 20 minutes. The four strips of cured paper were then stacked one on top of the other and the stack placed between two chromium-plated steel plates. The stack of saturated paper strips was then pressed in a preheated press at 1500 p.s.i. for 13 minute to a temperature of 149° C. Thereafter the heat was shut off, the plates cooled below 50° C. with cold water while maintaining the pressure constant during the cooling period. The press was then opened and the laminate removed.

The laminate prepared in the manner described above was then tested for color degradation by first obtaining the blue, green and red reflectance values of the laminate using the Colormaster Differential Colorimeter. Thereafter, the laminate was placed on the turntable directly beneath the battery of sunlamps. A thermometer was placed on the turntable for reading the temperature at the surface of the turntable and the latter rotated for a period of 4 hours. At the end of this time, the laminate was removed from the turntable and the blue, green and red reflectance values of the exposed portion of the laminate was redetermined using the colorimeter. The average total discoloration in percentage was then calculated using the formula set out above. For the specimen laminates prepared by Example V the percent discoloration, or U.V.D. value was 12.1%.

EXAMPLE VI

In this example the same hydrous metal oxide coated pigment was used as is described in Example V, except that following drying at 120° C. the pigment was calcined at 350° C. to partially dehydrate the hydrous oxide coating, after which it was chaser milled and pulverized.

When this coated pigment was used in the preparation of a paper laminate, in the manner described above, the U.V.D. value of the laminate was 1.2%.

EXAMPLES VII–X

Additional experiments were run in which several samples of untreated, uncoated $TiO_2$ burner discharge were coated with hydrous oxides, as described in Example V, which were at least, partially dehydrated by calcining at different temperatures. The resinous material used in preparing the laminates of Example VII was urea-formaldehyde while the resinous material used in Examples VIII–X was melamine. The U.V.D. values of the respective laminates after exposures to ultra violet light are given in Table II below. It will be seen from the accumulated data that pyrogenic $TiO_2$ calcined at temperatures in the range of from 350 C. to 600° C. gave the lowest U.V.D. values while laminates pigmented with a pyrogenic $TiO_2$ and dried at 120° C. (Example V) had extremely high U.V.D. values.

EXAMPLES XI–XIII

A second series of runs was made using hydrous oxide coated pigments calcined at temperatures within the range of 500–650° C. and having different preburner additions of aluminum oxide. In Example XI a 3% preburner addition of $Al_2O_3$ was used and the coating was at least, partially dehydrated by calcining at 500° C. As shown in Table II the U.V.D. value of the pigmented melamine laminate was 3.4%. In Examples XII and XIII the preburner additions of aluminum oxide were 0 (none) and 1% respectively, and each hydrous oxide coated pigment was calcined at 650° C. The pigment having no preburner addition gave a U.V.D. value in a melamine paper laminate of 2.7% while the pigment having 1% preburner addition also gave a U.V.D. value of 2.7%.

TABLE II.—U.V.D. VALUES OF RESINOUS MATERIAL PIGMENTED WITH HYDROUS OXIDE COATED PYROGENIC $TiO_2$

| Examples | V | VI | VII | VIII | IX | X |
|---|---|---|---|---|---|---|
| Preburner Addition, percent: $Al_2O_3$ | 2 | 2 | 2 | 2 | 2 | 2 |
| Treatment, percent: | | | | | | |
| $Al_2O_3$ | 4 | 4 | 4 | 4 | 4 | 4 |
| $SiO_2$ | 2 | 2 | 2 | 2 | 2 | 2 |
| Mole ratio | 1:1 | 1:1 | 1:1 | 1:1 | 1:1 | 1:1 |
| Dried: Temp., °C | 120 | | | | | |
| Calcined: Temp., °C | | 120 | 350 | 500 | 500 | 200 | 600 |
| Resin* | M | M | U | M | M | M |
| U.V.D | 12.1 | 1.2 | 0.8 | 1.3 | 4.5 | 1.6 |

| Examples | XI | XII | XIII |
|---|---|---|---|
| Preburner Addition, percent: $Al_2O_3$ | 3 | None | 1 |
| Treatment, percent: | | | |
| $Al_2O_3$ | 4 | 4 | 4 |
| $SiO_2$ | 2 | 2 | 2 |
| Mole ratio | 1:1 | 1:1 | 1:1 |
| Calcined: Temp., °C | 500 | 650 | 650 |
| Resin* | M | M | M |
| U.V.D., percent | 3.4 | 2.7 | 2.7 |

*M—melamine formaldehyde resin. U—urea formaldehyde resin.

EXAMPLES XIV–XV

In all of the preceding examples the alumina-silica coatings were in the mole ratio of 1:1 and in an amount of 6% by weight of the $TiO_2$. Additional pyrogenic pigments were prepared, as described in Example V, in which the preburner additions of $Al_2O_3$ were 2.0% and the mole ratio of the hydrous metal oxides was again 1:1 but the total amount of coating used was 2% and 15% respectively by weight of $TiO_2$. After calcination at 500° C. and micropulverizing these pigments were incorporated in paper laminates. The U.V.D. values are shown in Table III below:

TABLE III.—U.V.D. VALUES OF RESINOUS MATERIALS PIGMENTED WITH HYDROUS OXIDES COATED PYROGENIC $TiO_2$

| Examples | XIV | XV |
|---|---|---|
| Preburner Addition, percent: $Al_2O_3$ | 2 | 2 |
| Treatment, percent: | | |
| $Al_2O_3+SiO_2$ | 2 | 15 |
| Mole ratio | 1:1 | 1:1 |
| Calcined: Temp., °C | 500 | 500 |
| Resin* | M | M |
| U.V.D., percent | 3.4 | 1.7 |

*M—melamine formaldehyde resin.

EXAMPLES XVI–IXX

Additional discoloration values were made on paper laminates, using both melamine and urea formaldehyde resin, pigmented with pyrogenic $TiO_2$ coated with hydrous oxides as described in Example V and calcined at 500° C. except that the mole ratio of $Al_2O_3$ and $SiO_2$ were varied for a given percentage of oxide coating on the pigment.

TABLE IV.—U.V.D. VALUES OF RESINOUS MATERIAL PIGMENTED WITH HYDROUS OXIDE COATED PYROGENIC $TiO_2$

| Examples | XVI | XVII | XVIII | IXX |
|---|---|---|---|---|
| Preburner Addition, percent: $Al_2O_3$ | 2 | 2 | 2 | 2 |
| 1st Treatment, percent: | | | | |
| $Al_2O_3$+$SiO_2$ | 6 | 6 | 6 | 6 |
| Mole ratio | 1:2 | 1:2 | 2:1 | 1:1 |
| Calcined: Temp., °C | 500 | 500 | 500 | 500 |
| 2nd. Treatment, percent: | | | | |
| $Al_2O_3$ | None | None | None | None |
| $SiO_2$ | None | None | None | None |
| Resin* | M | U | U | M |
| U.V.D., percent | 1.5 | 1.2 | 1.5 | 1.5 |

*M—melamine formaldehyde resin. U—urea formaldehyde resin.

EXAMPLES XXI–XXIII

In the foregoing examples the $TiO_2$ burner discharge was coated with the hydrous oxides of aluminum and silicon as described in Example V. Additional experiments were made using a $TiO_2$ burner discharge coated with an aluminum silicate as follows:

To a slurry comprising 400 grams pyrogenic $TiO_2$ at 20% solids and at 60° C. as was added 176 ml. of an alkalized sodium silicate solution comprising 3.5 grams sodium hydroxide and 8.8 grams of silica and 376 ml. of an aqueous solution of sodium hydroxide. The alkalized slurry was stirred 15 minutes for uniformity. Thereupon 152 ml. of an aqueous solution of aluminum sulfate comprising 15.2 grams $Al_2O_3$ and an equivalent of 43.6 grams of $H_2SO_4$ were added to the alkalized slurry to precipitate an aluminum silicate gel at a pH of 7.5. This slurry, comprising a pyrogenic $TiO_2$ pigment coated with the hydrous aluminum silicate was stirred for 15 minutes at 60° C. and filtered. The filter cake was washed with water to remove soluble salts, dried and portions were calcined at temperatures of 350° C., 400° C. and 450° C. respectively to partially dehydrate the aluminum silicate coating, after which the pigments were chaser milled and pulverized. These pigments were then incorporated in paper laminates in the manner hereinabove described and tested for color degradation. The test results are shown in Table V below:

TABLE V.—U.V.D. VALUES OF RESINOUS MATERIALS PIGMENTED WITH ALUMINUM SILICATE COATED PYROGENIC $TiO_2$

| Cal. temp., °C | *None | 350 | 400 | 450 |
|---|---|---|---|---|
| U.V.D. | 10.0 | 2.3 | 2.4 | 2.4 |

*Dried at 120° C.

From the foregoing examples, it is clear that an untreated, uncoated $TiO_2$ burner discharge having at least a partially dehydrated coating of the hydrous oxides of aluminum and silica, or aluminum silicate, will, when incorporated in coating compositions, i.e. paints, enamels, etc., impart superior chalking characteristics thereto; and when incorporated in resinous materials and in particular melamine and urea formaldehyde paper laminates insure low color degradation when exposed to ultra violet light.

The invention may be carried out in other specific ways than those herein set forth without departing from the spirit and essential characteristics of the invention and the present embodiments are therefore to be considered in all respects as illustrative and not restrictive and all changes coming within the meaning and equivalency range of the appended claims are intended to be embraced therein.

I claim:

1. A photochemically inert $TiO_2$ pigment comprising; untreated, uncoated $TiO_2$ burner discharge having a partially dehydrated hydrous oxide coating thereon consisting of alumina and silica in a mole ratio of from 1:1 to 2:1 and in an amount from 2 to 15% by weight of the $TiO_2$.

2. A photochemically inert $TiO_2$ pigment according to claim 1 wherein said partially dehydrated hydrous oxide coating is aluminum silicate.

3. A process for producing a photochemically inert $TiO_2$ pigment comprising the steps of: preparing an aqueous slurry of untreated, uncoated $TiO_2$ burner discharge containing occluded chlorine, adding an antichlor to said slurry to remove said chlorine from said $TiO_2$ slurry, adding from 1 to 4% of silica as a soluble salt of silicon and from 3–7% alumina as a soluble salt of aluminum to the resulting aqueous slurry, agitating the slurry, neutralizing the slurry by adding an alkali metal hydroxide thereto to precipitate the insoluble hydrous oxides of silicon and aluminum on said $TiO_2$ burner discharge, washing the hydrous oxide coated to $TiO_2$ to remove any soluble salts therefrom, calcining the coated $TiO_2$ at a temperature from 200–500° C. to partially dehydrate the hydrous oxide coating and then milling the partially dehydrated hydrous oxide coated $TiO_2$.

4. In a process for producing a paper wherein $TiO_2$ pigment and a resinous binder are incorporated in the paper stock from which the paper is prepared, said resinous binder being an amine formaldehyde resin selected from the group consisting of melamine and urea formaldehyde resin, the improvement comprising: incorporating in said paper stock a pyrogenic $TiO_2$ pigment consisting of untreated, uncoated $TiO_2$ burner discharge having a coating thereon consisting of partially dehydrated hydrous oxides of alumina and silica in a mole ratio from 1:1 to 2:1, the amount of alumina and silica being from 2–15% by weight of the $TiO_2$, and preparing a paper from said paper stocks.

5. Process according to the improvement of claim 4 wherein the partially dehydrated hydrous oxide coating on said untreated, uncoated $TiO_2$ burner discharge is aluminum silicate.

6. A pigmented resinous material comprising in combination; and amine formaldehyde resin the amine being selected from the group consisting of melamine and urea formaldehyde and a pyrogenic $TiO_2$ pigment consisting of untreated, uncoated $TiO_2$ burner discharge having a coating thereon of partially dehydrated alumina and silica in the mole ratio of 1:1 to 2:1 the amount of alumina and silica being from 2 to 15% by weight of the $TiO_2$.

7. A pigmented resinous material according to claim 6 wherein the partially dehydrated hydrous oxide coating on said untreated, uncoated $TiO_2$ burner discharge is aluminum silicate.

References Cited

UNITED STATES PATENTS

| 2,559,638 | 7/1951 | Krchma | 23—202 |
| 3,035,966 | 5/1962 | Siuta | 106—300 |
| 3,146,119 | 8/1964 | Ritter | 106—300 |
| 3,203,818 | 8/1965 | Rechmann et al. | 106—300 |
| 3,251,705 | 5/1966 | Rieck et al. | 106—300 |

TOBIAS E. LEVOW, *Primary Examiner.*

SAMUEL E. MOTT, *Assistant Examiner.*